Figure 3:
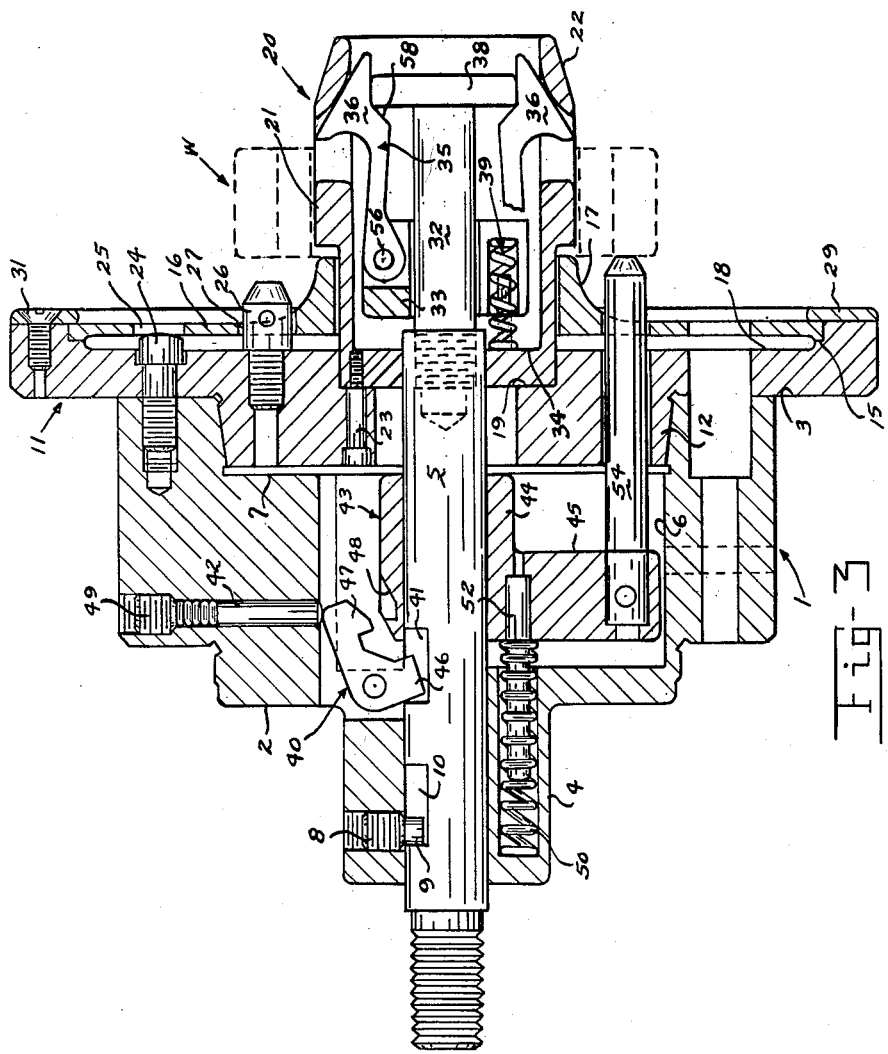

Jan. 26, 1960 R. P. GARRISON ET AL 2,922,657
AUTOMATIC CHUCK
Filed March 3, 1958 2 Sheets-Sheet 1
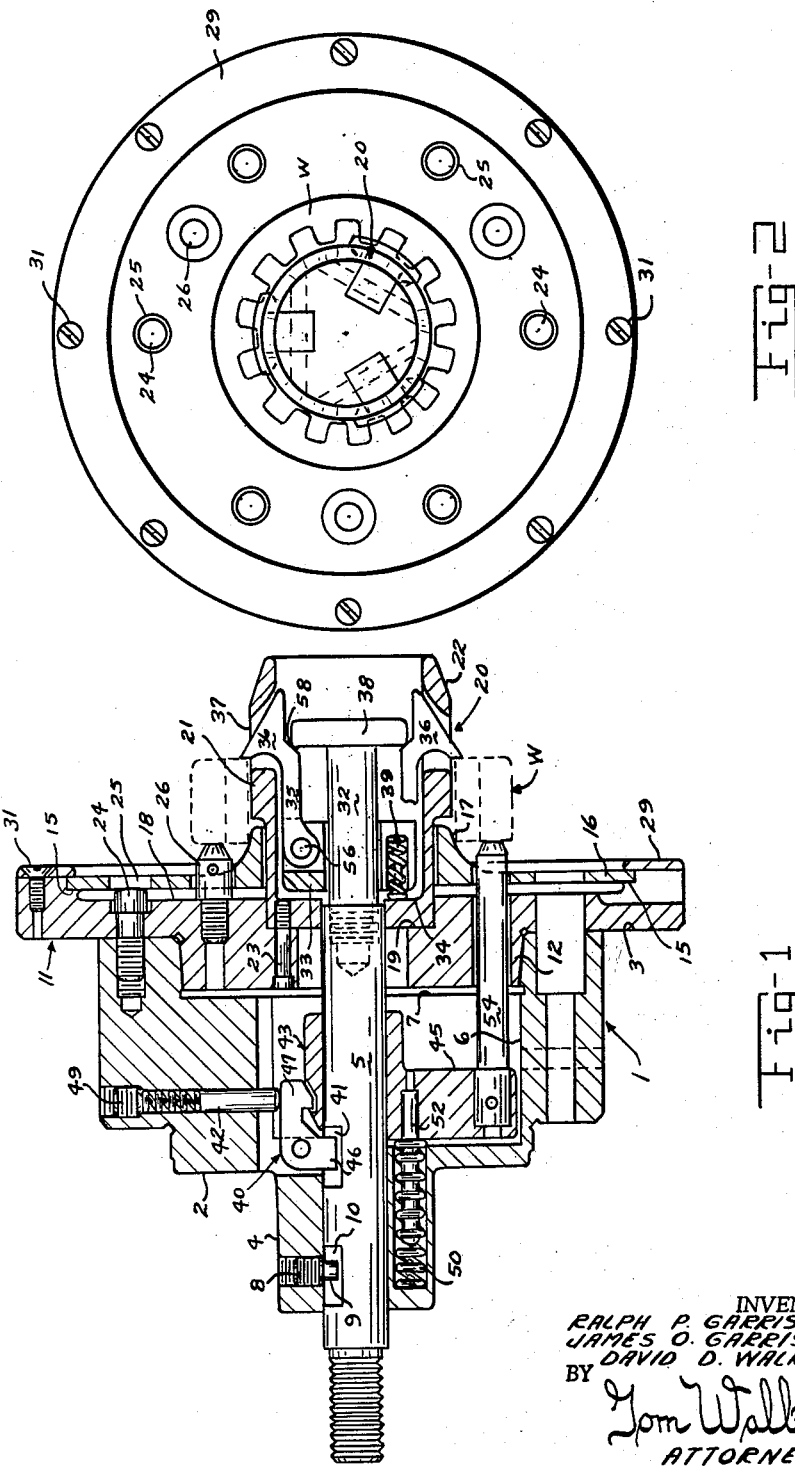
INVENTORS
RALPH P. GARRISON
JAMES O. GARRISON
DAVID D. WALKER
BY
Tom Walker
ATTORNEY Jan. 26, 1960  R. P. GARRISON ET AL  2,922,657
AUTOMATIC CHUCK Filed March 3, 1958  2 Sheets-Sheet 2

INVENTORS
RALPH P. GARRISON
JAMES O. GARRISON
DAVID D. WALKER
BY
Tom Walker
ATTORNEY

United States Patent Office 2,922,657
Patented Jan. 26, 1960

2,922,657

AUTOMATIC CHUCK

Ralph P. Garrison, James O. Garrison, and David D. Walker, Dayton, Ohio, assignors to Garrison Machine Works, Inc., Dayton, Ohio, a corporation of Ohio Application March 3, 1958, Serial No. 718,819

17 Claims. (Cl. 279—106)

This invention relates to chucks and more particularly to a novel bore edge chuck.

With the development of automation many chucking devices have proven inadequate to serve their intended function. Moreover, with technological advancement, the shapes and nature of parts which must be chucked and machined have become more diversified. Accordingly, a demand and necessity has presented itself for more versatile chucks capable of properly functioning, successively and automatically, so as to enable precision machining of parts with a minimum of induced stress and strain.

The present invention fills a need in this area. It provides substantial improvement in chucks which simplifies them and renders them highly effective for continuously automatic chucking operations. Practical embodiments of the invention in preferred form enable the chucking of parts, which are internally bored but not internally machined, for precision machining of their peripheral surface. The chucks available for such application in the prior art are relatively inefficient, particularly for automatic operation, and generally cause working stresses. Embodiments of the present invention function in a manner to render such working stresses practically non-existent.

The invention in preferred form provides a bore edge chuck which precisely and automatically chucks a work piece in a free yet positively located condition so that the work may be precision machined as to its peripheral contour, free of any holding distortion. The work pieces which may be handled appropriately by the invention embodiment need only have a single machined face and the internally bored parts need not have a uniform cross-sectional contour. While a particular application and structure of the invention will be described herein to highlight the versatility and efficiency thereof in use, those versed in the art will clearly recognize that the application and embodiment of the invention is not so limited, nor is such intended.

A primary object of the invention is to provide improvements in internal chucks whereby such devices may be more economically manufactured, adaptable to a wider variety of applications, more efficient and satisfactory in use, have a longer effective operating life and require a minimum of maintenance.

A further object of the invention is to provide an improved chuck particularly adapted for the internal chucking of work pieces in a manner enabling efficient automatic chucking.

Another object of the invention is to provide an improved chuck adapted to automatically and positively position a work piece having an internal bore, irrespective of the contour thereof.

An additional object of the invention is to provide a chuck particularly advantageous for chucking of work pieces having an internal bore, irrespective of the irregularities of its chucking surface and its cross-sectional contour.

Another object of the invention is to provide a chuck having simplified and improved automatically operating work retention means.

Another object of the invention is to provide draw bar operated chucks with simplified and improved latch means.

A further object of the invention is to provide a novel bore edge chuck.

A further object of the invention is to provide a diaphragm control in a bore edge chuck.

A further object of the invention is to provide an automatic chuck possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 is a longitudinal cross-sectional view of a chuck in accordance with the invention with a work piece chucked thereto;

Fig. 2 is an end view of the device of Fig. 1 showing the work piece in a chucked condition; and Fig. 3 is a longitudinal cross-sectional view similar to that of Fig. 1 but showing the parts in a work ejecting condition.

Like parts are indicated by similar characters of reference throughout the several views.

As shown, a chuck housing 1 is provided having a through bore which is expanded in stepped fashion from its inner face 2 to its outer face 3. At the face 2 of the housing 1, the bore is defined by a coaxial tubular projection 4 integral with the housing and projecting rearwardly therefrom.

The tubular projection 4 provides a bearing for a cylindrical rod 5 which is connected to a draw bar (not shown). The rod 5 extends through the housing and is reciprocable relative thereto.

Immediately forward of the tubular projection 4 within the housing 1, the through bore is uniformly expanded at an intermediate section 6 to a plane parallel to and spaced inwardly from the outer face of the housing 1 where it is further expanded to provide a shoulder 7 parallel to the outer face 3. From the shoulder 7, the bore of housing 1 is conically expanded to its outer face.

A screw 8 is radially engaged through the wall of the tubular projection 4 to have its inner stud extremity 9 project within an elongated substantially rectangular notch 10 in the surface of the rod 5. This prevents rotative movement of the rod relative the housing.

A plate 11 having a central conically formed projection 12 seats over the outer face of the housing 1 to dispose its conical projection 12 in nested relation to the conically expanded surface of the bore of housing 1. The plate 11 and its integral projection 12 are centrally apertured coaxially with the through bore of the housing 1. The outermost face of the plate 11 is concentrically recessed in stepped fashion inwardly to its central aperture. The first step provides a narrow annular shoulder 15 parallel to its outer face and immediately inward of its periphery. A resilient metallic diaphragm 16, which is centrally apertured, peripherally seats to the shoulder 15. The diaphragm 16 is provided with an integral tapered projection 17 about and defining its central aperture. A second step in the outer face of the plate 11 provides an intermediate annular shoulder 18 and a further step inwardly to the central aperture of the plate 11 provides a relatively narrow annular shoulder 19 coaxial with the aperture in the diaphragm.

A generally tubular guide element 20 seats at its inner extremity to the shoulder 19, coaxially with the bore of the housing 1. The guide 20 projects through the central aperture in the diaphragm and is peripherally enlarged at 21 immediately forward of the tapered projection of the diaphragm while its outer extremity is externally tapered at 22. The internal diameter of the guide 20 is reduced at its innermost end to provide a cylindrical bearing surface for the projecting end of the rod 5. The guide 20 is fixed to the plate 11 by screws 23 engaged through the projection 12 and into the base thereof.

Screws 24 engage through the shoulder 18 of the plate 11 into the housing face 3 to fix the plate thereto. The diaphragm 16 has apertures 25 aligned with the heads of the screws 24 which project from the shoulder 18.

Rest buttons 26 are circularly arranged on the shoulder 18 of the plate 11 and threadedly engaged thereto. The rest buttons project perpendicularly from the shoulder and through aligned apertures 27 in the diaphragm immediately about the tapered projection 17. An annular ring plate 29 fixed over the outer edge of the outer face of the plate 11 by screws 31 has its inner periphery overlying the periphery of the diaphragm 16 to fix it to the shoulder 15.

A rod extension element 32 is fixed in a central recess in the forward extremity of the rod 5 to project coaxially within the guide 20. The diameter of the extension 32 is less than that of the rod 5.

A sleeve 33 is slidably mounted on the extension 32, forwardly of the internally reduced portion of guide 20 which provides a shoulder 34 facing outwardly relative the chuck body.

The end of sleeve 33 adjacent the shoulder 34 has circularly spaced recesses seating springs 39. The springs 39 project from the sleeve 33 about guide pins 60 fixed to shoulder 34 to bias the sleeve from the shoulder. The forward end of sleeve 33 has three equidistantly spaced notches, each transversely bridged by a pivot pin 56. Each pivot pin 56 pivotally mounts the inner end of a finger 35. The fingers 35 extend axially of guide 20 about the rod extension 32 which has an expanded extremity in the form of a disc 38 having a rounded periphery. The fingers 35 are identical in that they have outwardly projecting hook extremities 36 which are triangular in cross-section and outwardly offset about the disc 38. The nature of the offset is that the innermost surfaces of the fingers 35 initially diverge at their hook portions 36 to provide sloped cam surfaces 58 and then extend axially again about the disc 38. The guide 20 has circularly extended slots 37 adapted to align with the hook extremities of the fingers 35. The forward edges of the slots 37 are tapered inwardly and forwardly of the guide 20 generally parallel to the outermost surfaces of the relatively adjacent hook portions of the elements 35. As may be seen in Fig. 1 of the drawings, drawing rod 5 and extension 32 rearwardly relative the body 1 results in the disc 38 engaging the cam surfaces 58 on the inner sides of fingers 35. This causes an axial displacement of fingers 35 and sleeve 33 compressing springs 39 between the sleeve and shoulder 34. Also, the hook extremities of the fingers 35 are aligned with slots 37 and cammed outwardly thereof under the influence of disc 38. Forward movement of disc 38 relieves the springs 39 which give an axial forward thrust to the sleeve to initiate the camming of the hook extremities of fingers 35 within guide 20.

Within the intermediate expanded section 6 of the housing bore, immediately forward of the rear face 2, a shedder plate 43 is slidably mounted about and on rod 5.

The shedder plate includes a tubular hub 44 with an annular skirt 45. Pivoted in the housing 1 adjacent the rear of the shedder 43 is a right angled latch 40 including a depending arm 46 disposed in an elongated rectangular notch 41 in the surface of the rod 5 and a forwardly projecting arm provided with a hook extension 47 for engaging in a notch 48 in the hub of the shedder 43. The housing 1 has a radial aperture aligned with the latch hook 47 accommodating a spring biased stud 42. A screw 49 contains the stud 42 in biased relation to the latch. With the rod 5 in forward position, as shown in Fig. 3, the latch arm 46 is cammed counterclockwise by rod 5 to bias the stud 42 into its guide aperture and provide the shedder 43 with freedom to move forwardly relative to rod 5 under the influence of springs 50 seated to the rear thereof in axial recesses in the housing and tubular projection 4, parallel to rod 5.

Guide studs 52 project rearwardly from the shedder 43 within the springs 50. Shedder pins 54 are circularly spaced in the skirt of the shedder 43 to project forwardly through aligned apertures in the plate 11 and diaphragm 16 in the path of the work piece W as it is delivered inwardly to the chuck housing over the guide 20.

The described embodiment of the invention is shown in application to a work piece W, the bore of which is splined. There is no assurance that the splined bore is round since it comes to the chuck after broaching and hardening. However, preliminary to chucking, both faces of the work piece are ground flat and parallel. This produces a knife edge at the bore. The described embodiment of the invention is so versatile that it can be applied to precision chuck such a part for grinding its outside contour to a very close tolerance.

In the function of the described apparatus to receive a workpiece the rod 5 and disc 38 are forward as in Fig. 3 of the drawings. In this position the hook extremities of the fingers 35 are cammed within the guide 20, the disc 38 is forwardly out of engagement with cam surfaces 58 of the fingers and the sleeve 33 is displaced forwardly relative shoulder 34. This permits the internally bored work piece W to be automatically delivered over the guide 20 and inwardly to the diaphragm 16. The inner face of the work piece may be limited by the rest buttons 26 and the knife edge of the bore at its inner face is quickly and accurately centralized by the tapered projection 17 of the diaphragm. The movement of the work piece inwardly to the diaphragm, causes it to engage the shedder pin elements 54 of the shedder 43 to bias the shedder inwardly towards the rear of housing 1 against the bias of the springs 50. On movement of the draw bar rearwardly of body 1, disc 38 engages cam surfaces 58 of fingers 35 applying an outward bias of the fingers about pivots 56 and a rearward bias of the sleeve 33 through the fingers. This effects an alignment of hook extremities 36 with guide slots 37, the disc camming the hooks outwardly of the guide through slots 37 to engage the hooks 36 over the outer face of the work piece at its inner periphery in lines constituting chords of a circle. At this point rod 5 is retracted in the rear end of guide 20, and the engaging pressure of disc 38 imposes a bias of sleeve 33 to shoulder 34 that compresses and energizes springs 39 therebetween. The work piece is thus biased to a bore edge mounting. Also, as the rod 5 moves rearwardly it cams the latch 40 clockwise and causes its hook extremity 47 to engage in the notch 48 of the shedder under the bias of stud 42 to hold the shedder in its rearward position.

It is noted that the taper angle of the diaphragm projection 17 locates the work piece centrally by means of the bore edge and prevents a grinding wheel from moving the piece out of this central position.

The chucking of the work piece disposes it in a relatively free state, completely relaxed, and free of any holding distortion. This enables a peripheral grinding of the work piece in precision fashion since the work piece, though relaxed, is contained against displacement and the operation may be effected without inducement of working stresses therein due to its relaxed mounting.

For automatic ejection of the work piece, the rod 5 need merely be moved forward to cause the latch arm 46 projecting into the notch 41 in the rod 5 to be cammed counterclockwise to disengage the latch from the shedder against the bias of the radially engaged stud 42. As the shedder moves forward under the influence of the biasing springs 50 which were compressed on chucking, the shedder pins start to move outwardly of the diaphragm. Also, as the rod 5 moves forward, the disc 38 relieves its pressure on fingers 35. The springs 39, being thus relieved, trigger the sleeve 33 and connected fingers forwardly to start the camming of the hook extremities 36 within guide 20. Due to the enlargement of rod 5 relative extension 32, a shoulder provided at the extremity of rod 5 engages the adjacent end face of sleeve 33 as it moves forward to cause the latch elements to be completely cammed within guide 20 in a manner believed obvious. Under the influence of springs 50, the shedder pins 54 engage and eject the work piece W from the guide 20.

As may be readily seen, the operation of the internal chuck in accordance with the invention is simple, yet very effective. The chuck parts are reduced to a minimum and their construction is of the utmost simplicity. There is fast accurate centralizing of the work pieces as they are delivered over the guide 20 and bore edge chucking affords maximum control in positioning of the work piece. This is so irrespective of the cross sectional configuration of the work bore. It will be readily recognized by those versed in the art that the bore edge containment is substantially stress free and very effective to maintain a work piece for precision machining of its outer periphery.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A chuck including a chuck housing, means projecting from one face of said housing for guiding a work piece thereto and resiliently mounted means projecting from said one face of said housing for automatically positioning the work piece by engagement of a single edge thereof.

2. A chuck including a housing, a resilient diaphragm mounted to said housing having means connected for edge mounting a work piece thereto and means mounted to said housing for clamping the workpiece to said diaphragm in its edge mounted position.

3. A chuck including, a housing, a resilient diaphragm over one face thereof, guide means projecting from said housing for guiding a work piece to abut said diaphragm, circumferentially extended slots in said guide means and means within said guide means automatically projectable through said slots to bridge the outermost surface of the work piece and lock it to said diaphragm.

4. An internal chuck including, a housing having a resilient annular bore edge centering means for freely positioning an internally bored work piece thereto and circularly arranged clamp means mounted to said housing for externally engaging and resiliently balancing, the work piece to said bore edge centering means.

5. A chuck including, an axially apertured housing, a draw bar element bearing in said housing and extending through the aperture therein, means for preventing rotation of said element relative said housing, said housing having a chucking face to one end of said element, a resilient centering device at said chucking face having a smoothly contoured surface for edge mounting a work piece to prevent planar shifting thereof and means connected to said draw bar element in circumferentially spaced positions and operative to engage the work piece in biased relation to said contoured surface.

6. An internal chuck including, a housing, a draw bar element extending axially through and bearing in said housing, a work guide element of a tubular nature projecting from the work receiving face of said housing about the projecting end of said draw bar element, a relatively expanded portion at the projecting end of said bar element, a sleeve on said projecting end of said bar element within said expanded portion having latch elements pivoted thereto circumferentially thereof and adapted for automatic radial projection relative said guide element by said expanded portion of said bar element for locking a work piece to the work receiving face of said housing.

7. A chuck comprising, a chuck housing having a recessed face, a diaphragm over said recessed face having bore edge positioning means centrally thereof for positioning an internally bored work piece to said housing, shedder means in said housing having shedder elements adapted to project through said diaphragm, latch means pivoted in said housing for latching said shedder means therein on chucking a work piece to said bore edge positioning means and means for pivoting said latch means to release said shedder means for projection of said shedder elements to automatically eject the work piece from a chucked condition.

8. An internal chuck comprising, a chuck housing, a diaphrgam mounted over one face of the chuck housing, said housing having an axial aperture, said diaphragm having an aperture axially aligned with said aperture in said housing, the portion of said diaphragm about the aperture therein being tapered, a draw bar operated element in said housing projectable through said apertures, the projectable end of said draw bar having means thereon including latch elements pivotally connected thereto, means for guiding a work piece to said diaphragm for edge mounting to its tapered portion, said latch elements on said draw bar element being projectable to engage the work piece in its edge mounted condition to said diaphragm by movement of said bar element inwardly relative said housing.

9. A draw bar operated chuck including, a chuck housing, said housing having an aperture, a draw bar element reciprocably mounted relative said housing and within the aperture therein, the outer end of said draw bar element projecting from the chucking face of said housing, a generally tubular guide element projecting from the chucking face of the said housing affording a bearing for said draw bar element and means mounted to said draw bar element within said tubular guide element for projection from said guide element for locking a work piece to said chuck housing on delivery over said guide element and means mounted in said chuck housing and cooperatively engaged in a notch in said draw bar element controlling the movement of said draw bar element relative said housing.

10. An internal chuck comprising, a housing centrally apertured having a draw bar element reciprocably mounted therein within said aperture, a tubular guide element seated in one face of said housing about a projecting end of said draw bar element, a sleeve on said bar element, retainer means confining said sleeve to said draw bar element, latch elements pivotally connected to said sleeve, said retainer means including means for biasing said latch elements to project radially of said guide element whereby in one position of said draw bar element, a work piece may be received over said guide element to said housing and in a second position of said draw bar element said latch elements will automatically engage the work piece to said chuck housing.

11. An internal chuck including, a chuck housing, resilient means for bore edge mounting of a work piece having an internal bore to one face of said housing and means mounted to said housing and operable for containing the work piece in a resiliently mounted condition to said bore edge mounting means.

12. A chuck including, a chuck housing, means projecting from one face of said housing for guiding a work piece thereto, resilient means projecting from said one face of said housing for automatically positioning the work piece by engagement of a single edge thereof, a rod reciprocably mounted within said housing for projection through said work guide, means on said rod including circularly spaced elements operative to contain a work piece delivered over said guide to said edge positioning means.

13. A chuck including, a chuck housing, means projecting from one face of said housing for guiding a work piece thereto, means projecting from said one face of said housing for automatically positioning the work piece by engagement of a single edge thereof, a rod reciprocably mounted within said housing for projection through said work guide, means on said rod operative to contain a work piece delivered over said guide to said edge positioning means, shedder means in said housing for projection to eject the work piece, means for latching said shedder means on chucking a work piece, said rod being operable to displace said containing means clear of the work piece and said guide means and to release said shedder means for ejection of the work piece.

14. A chuck including, a housing, a resilient diaphragm mounted to said housing having bore edge positioning means integrally connected thereto for internally chucking a work piece, a work guide projecting from said housing and through said bore edge positioning means, a rod reciprocably mounted within said housing for projection through said work guide, means on said rod for automatic projection through said work guide for engaging a work piece to said bore edge positioning means.

15. A chuck comprising, a housing having work guide means projecting from one face, resiliently mounted bore edge mounting means for positioning a work piece to said one face concentric to said guide means and circularly related means operatively related to said housing for engaging a work piece to said bore edge mounting means, said circularly related means engaging the work piece in lines constituting chords of a circle.

16. A draw bar operated chuck including, a housing having a draw bar element reciprocable therein to project from its chucking face, a tubular work guide projecting from the chucking face of said housing about said element, bore edge positioning means connected to said chucking face about said work guide, said work guide having circumferentially arranged arcuate slots and means on said draw bar element within the limits of said guide for projection from said slots to engage a work piece to said bore edge positioning means the engagement of said means with the work piece being in lines constituting chords of a circle.

17. A chuck according to claim 10, characterized by a sleeve on said bar element within said guide mounting the projectable means, means confining said sleeve for limited movement on said bar element, biasing means intermediate said housing and sleeve limiting the inward movement of said sleeve relative the housing, said projectable means including latch elements pivoted to said sleeve, one of said confining means being operative on retraction of said bar element to cam said latch elements through said slots.

References Cited in the file of this patent
UNITED STATES PATENTS

| | | |
|---|---|---|
| 957,201 | Gail | May 10, 1910 |
| 1,491,332 | Brown | Apr. 22, 1924 |
| 1,652,857 | Greve | Dec. 13, 1927 |
| 2,050,828 | Buell | Aug. 11, 1936 |
| 2,473,380 | Ljunggren et al. | June 14, 1949 |
| 2,820,641 | Garrison | Jan. 21, 1958 |